United States Patent
Hiraishi

(10) Patent No.: US 11,708,269 B2
(45) Date of Patent: Jul. 25, 2023

(54) METHOD FOR PRODUCING SEMICONDUCTING SINGLE-WALLED CARBON NANOTUBE DISPERSION

(71) Applicant: KAO CORPORATION, Tokyo (JP)

(72) Inventor: Atsushi Hiraishi, Takaishi (JP)

(73) Assignee: KAO CORPORATION, Tokyo (JP)

( * ) Notice: Subject to any disclaimer, the term of this patent is extended or adjusted under 35 U.S.C. 154(b) by 374 days.

(21) Appl. No.: 17/057,591

(22) PCT Filed: May 22, 2019

(86) PCT No.: PCT/JP2019/020286
§ 371 (c)(1),
(2) Date: Nov. 20, 2020

(87) PCT Pub. No.: WO2019/225651
PCT Pub. Date: Nov. 28, 2019

(65) Prior Publication Data
US 2021/0188642 A1    Jun. 24, 2021

(30) Foreign Application Priority Data
May 23, 2018   (JP) .................................. 2018-098658

(51) Int. Cl.
*C01B 32/159* (2017.01)
*C01B 32/172* (2017.01)
(Continued)

(52) U.S. Cl.
CPC ............ *C01B 32/159* (2017.08); *B01D 21/01* (2013.01); *B01D 21/262* (2013.01);
(Continued)

(58) Field of Classification Search
CPC ... C01B 32/159; C01B 32/172; C01B 32/174; C01B 2202/02; C01B 2202/22;
(Continued)

(56) References Cited

U.S. PATENT DOCUMENTS

2006/0054555 A1    3/2006  Sun
2010/0278714 A1    11/2010 Tanaka et al.
(Continued)

FOREIGN PATENT DOCUMENTS

CN   101759177 A   6/2010
CN   102019224 A   4/2011
(Continued)

OTHER PUBLICATIONS

Moshammer, et al., Selective Suspension in Aqueous Sodium Dodecyl Sulfate According to Electronic Structure Type Allows Simple Separation of Metallic from Semiconducting Single-Walled Carbon Nanotubes, Nano Res 2009; 2: 599-606 (Year: 2009).*
(Continued)

*Primary Examiner* — Daniel C. Mccracken
(74) *Attorney, Agent, or Firm* — Birch, Stewart, Kolasch & Birch, LLP

(57) ABSTRACT

A method for producing a semiconducting SWCNT dispersion of the present invention comprises: a step A of preparing a to-be-separated SWCNT dispersion that includes a SWCNT mixture, an aqueous medium, and a polymer including a structural unit A derived from a monomer represented by Formula (1), and a step B of centrifuging the to-be-separated SWCNT dispersion and subsequently collecting a supernatant including the semiconducting SWCNT from the centrifuged to-be-separated SWCNT dispersion. The weight-average molecular weight of the polymer is 1,000 or more and 100,000 or less.

(Continued)

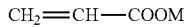

(1)

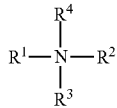

(2)

15 Claims, 1 Drawing Sheet

(51) Int. Cl.
*C01B 32/174* (2017.01)
*B01D 21/01* (2006.01)
*B01D 21/26* (2006.01)
*C09D 11/52* (2014.01)
*B82Y 30/00* (2011.01)
*B82Y 40/00* (2011.01)
*C08F 20/06* (2006.01)

(52) U.S. Cl.
CPC .......... *C01B 32/172* (2017.08); *C01B 32/174* (2017.08); *C09D 11/52* (2013.01); *B82Y 30/00* (2013.01); *B82Y 40/00* (2013.01); *C01B 2202/02* (2013.01); *C01B 2202/22* (2013.01); *C01P 2004/13* (2013.01); *C01P 2004/64* (2013.01); *C01P 2006/40* (2013.01); *C08F 20/06* (2013.01)

(58) Field of Classification Search
CPC ..... C01B 32/158; C01B 32/16; C01B 32/162; C01B 32/164; C01B 32/166; C01B 32/168; C01B 32/17; C01B 32/176; C01B 32/178; C01B 2202/00; C01B 2202/04; C01B 2202/06; C01B 2202/08; C01B 2202/10; C01B 2202/20; C01B 2202/24; C01B 2202/26; C01B 2202/28; C01B 2202/30; C01B 2202/32; C01B 2202/34; C01B 2202/36; B01D 21/01; B01D 21/262; C09D 11/52; C09D 11/03; B82Y 30/00; B82Y 40/00; C01P 2004/13; C01P 2004/64; C01P 2006/40; C08F 20/06; B03B 5/28; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

U.S. PATENT DOCUMENTS

| | | |
|---|---|---|
| 2011/0280791 A1 | 11/2011 | Tanaka et al. |
| 2012/0104328 A1 | 5/2012 | Park et al. |
| 2013/0180897 A1 | 7/2013 | Tanaka et al. |
| 2014/0174991 A1 | 6/2014 | Khripin et al. |
| 2016/0137505 A1 | 5/2016 | Nakashima et al. |
| 2017/0229657 A1 | 8/2017 | Bao et al. |
| 2017/0305745 A1 | 10/2017 | Reis et al. |
| 2018/0016148 A1 | 1/2018 | Gui et al. |
| 2018/0099870 A1 | 4/2018 | Gopalan et al. |

FOREIGN PATENT DOCUMENTS

| | | |
|---|---|---|
| CN | 103112840 A | 5/2013 |
| CN | 108804109 A | 6/2017 |
| CN | 107074549 A | 8/2017 |
| CN | 107151311 A | 9/2017 |
| JP | 2007-519594 A | 7/2007 |
| JP | 2008-55375 A | 3/2008 |
| JP | 2010-1162 A | 1/2010 |
| JP | 2012-36041 A | 2/2012 |
| JP | 2013-141631 A | 7/2013 |
| JP | 2014-503445 A | 2/2014 |
| WO | WO 2009/075293 A1 | 6/2009 |
| WO | WO 2012/060601 A2 | 5/2012 |
| WO | WO 2014/136981 A1 | 9/2014 |
| WO | WO 2015/130229 A1 | 9/2015 |
| WO | WO 2017/117646 A | 7/2017 |

OTHER PUBLICATIONS

Saint-Aubin, et al., Dispersion and Film-Forming Properties of Poly(acrylic acid)-Stabilized Carbon Nanotubes, Langmuir 2009; 25(22); 13206-13211 (Year: 2009).*
XP002806598 Database WPI, Week 201777 "New iso-indigo-based conjugated polymer useful in semiconductor carbon nanotube (CNT) ink for manufacturing semiconductor device," Thomas Scientific, Sep. 12, 2017, 3 pages total.
XP002806600 Database WPI, Week 201414 "Selective separation method of semiconductor carbon nanotube for printable semiconductor ink and printed electronic device comprises dispersing carbon nanotube in polymer-containing organic solution, centrifuging and separating," Thomas Scientific, May 22, 2013, 2 pages total.
Extended European Search Report for corresponding European Application No. 19806926.2, dated Jun. 8, 2022.
International Search Report issued in PCT/JP2019/020286 (PCT/ISA/210), dated Jul. 2, 2019.
Indian Office Action for Indian Application No. 202017053160, dated Mar. 11, 2021, with English translation.

* cited by examiner

METHOD FOR PRODUCING SEMICONDUCTING SINGLE-WALLED CARBON NANOTUBE DISPERSION

TECHNICAL FIELD

The present invention relates to a method for producing a semiconducting single-walled carbon nanotube dispersion, and a method for producing a semiconducting single-walled carbon nanotube comprising the producing method as a step, and a method for separating a metallic single-walled carbon nanotube and a semiconducting single-walled carbon nanotube.

BACKGROUND ART

Recently, nanometer-sized carbon materials are expected to be applied to various fields due to their physical and chemical properties. One such material is carbon nanotubes (hereinafter sometimes referred to as "CNTs"). CNTs have a structure in which a graphene sheet is rounded in a cylindrical shape, and CNTs in which the cylinder consists of only one layer are called single-walled carbon nanotubes (hereafter sometimes referred to as "SWCNTs").

It is known that CNTs have different electrical properties and the like depending on the winding manner of graphene sheets, diameter, etc. Particularly because SWCNTs are greatly affected by the quantum effect, some SWCNTs are metallic (metallic CNTs) and the others are semiconducting (semiconducting CNTs). As methods for producing a SWCNT, a synthetic method such as a high pressure carbon monoxide disproportionation method (HiPco method), an enhanced Direct Injection Pyrolysis Synthesis method (e-DIPS method), an arc-discharge method, and a laser ablation method are known, but at present, a technique for producing only one type of CNT has not been established, and when an SWCNT is applied to various applications, it is necessary to separate a target type of SWCNT from a mixture thereof. Metallic CNTs are expected to utilize their excellent conductivity for transparent electrodes for touch panels and solar cells, utilization for fine wiring of devices, etc., and semiconducting CNTs are expected to be applied to transistors and sensors, etc.

Several methods for separating metallic SWCNT and semiconducting SWCNT have been reported. For example, a density gradient centrifugation method in which a SWCNT is dispersed using a surfactant such as sodium dodecyl sulfate or sodium cholate, mixed with a density gradient agent, and centrifuged (Patent Document 1), an electric field separation method in which an electric field is applied to a dispersion in which a SWCNT is dispersed using a surfactant (Patent Document 2), a method in which a semiconducting SWCNT and a separating agent such as a porphyrin are mixed in an organic solvent to form a composite of the semiconducting SWCNT and the separating agent, and the composite is extracted (Patent Document 3), a method in which a semiconducting SWCNT and a separating agent such as a polythiophene derivative is mixed in an organic solvent, and the interaction between the separating agent and the semiconducting SWCNT is utilized to selectively separate the semiconducting SWCNT (Patent Document 4), a method in which a semiconducting SWCNT and a separating agent such as a flavin derivative is mixed in an organic solvent, and an adsorption action on a semiconducting SWCNT of the separating agent is utilized to separate the semiconducting SWCNT (Patent Document 5), and a method in which a dispersion in which a SWCNT is dispersed using a surfactant is placed in a separation container filled with a separation material such as an agar gel, and a semiconducting SWCNT adsorbed on the separation material are eluted from the separation material using an eluent (Patent Document 6) are known.

PRIOR ART DOCUMENTS

Patent Document

[Patent Document 1] JP 2010-1162A
[Patent Document 2] JP 2008-55375A
[Patent Document 3] JP 2007-519594A
[Patent Document 4] JP 2014-503445A
[Patent Document 5] WO 2014/136981
[Patent Document 6] JP 2012-36041A

DISCLOSURE OF INVENTION

Problem to be Solved by the Invention

However, in the separation methods disclosed in Patent Documents 1 and 6, a density gradient agent, an agar gel, and the like are required, and many operation steps are performed. In the separation method disclosed in Patent Document 2, a device for electrophoresis is required, and in addition, a time-consuming separation is required and the concentration of separated SWCNT is low. The separation methods disclosed in Patent Documents 3, 4 and 5 have little practical application because they need to be performed in a nonpolar solvent and an expensive separating agent is required.

The present invention relates to a method for producing a semiconducting SWCNT dispersion in which the separation of a semiconducting SWCNT from a SWCNT mixture containing a semiconducting SWCNT and a metallic SWCNT can be performed in an aqueous medium using an easily available separating agent and a simple operation, a method for producing a semiconducting SWCNT comprising the producing method as a step, a method for separating a semiconducting SWCNT and a metallic SWCNT, and a method for producing a semiconducting SWCNT containing ink.

Means for Solving Problem

A method for producing a semiconducting SWCNT dispersion of the present invention is a method for producing a semiconducting single-walled carbon nanotube dispersion, comprising:

a step A of preparing a to-be-separated SWCNT dispersion that includes a SWCNT mixture containing a semiconducting SWCNT and a metallic SWCNT, an aqueous medium, and a polymer including a structural unit A derived from a monomer represented by the following formula (1); and a step B of centrifuging the to-be-separated SWCNT dispersion and subsequently collecting a supernatant including the semiconducting SWCNT from the centrifuged to-be-separated SWCNT dispersion, wherein a weight-average molecular weight of the polymer is 1,000 or more and 100,000 or less.

$$CH_2=CH-COOM \qquad (1)$$

In Formula (1), M represents any one of a hydrogen atom, a metal atom, or a group having a structure represented by the following Formula (2).

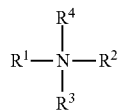

(2)

In Formula (2), $R^1$, $R^2$, $R^3$, and $R^4$ independently represent a hydrogen atom or an alkyl group having 1 to 2 carbon atoms that optionally has a hydroxyl group.

A method for producing a semiconducting SWCNT of the present invention is a method for producing a semiconducting SWCNT, comprising a step of collecting a semiconducting SWCNT by filtering a semiconducting SWCNT dispersion obtained using the method for producing a semiconducting SWCNT dispersion of the present invention.

A method for separating a semiconducting SWCNT and a metallic SWCNT of the present invention is a method for separating a semiconducting SWCNT and a metallic SWCNT, comprising:

a step A of preparing a to-be-separated SWCNT dispersion that includes a SWCNT mixture containing a semiconducting SWCNT and a metallic SWCNT, an aqueous medium, and a polymer including a structural unit A derived from a monomer represented by the following formula (1); and a step B of centrifuging the to-be-separated SWCNT dispersion and subsequently collecting a supernatant including the semiconducting SWCNT from the centrifuged to-be-separated SWCNT dispersion, wherein a weight-average molecular weight of the polymer is 1,000 or more and 100,000 or less.

$$CH_2=CH-COOM \qquad (1)$$

In Formula (1), M represents any one of a hydrogen atom, a metal atom, or a group having a structure represented by the following Formula (2).

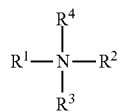

(2)

In Formula (2), $R^1$, $R^2$, $R^3$, and $R^4$ independently represent a hydrogen atom or an alkyl group having 1 to 2 carbon atoms that optionally has a hydroxyl group.

A method for producing a semiconducting SWCNT containing ink of the present invention is a method for producing a semiconducting SWCNT containing ink, comprising the method for producing a semiconducting SWCNT dispersion of the present invention, or the method for producing a semiconducting SWCNT of the present invention as one step.

Effects of the Invention

According to the present invention, it is possible to provide a method for producing a semiconducting SWCNT dispersion that can be performed in an aqueous medium using an easily available separating agent and a simple operation, a method for producing a semiconducting SWCNT including the producing method as a step, a method for separating a semiconducting SWCNT and a metallic SWCNT, and a method for producing a semiconducting SWCNT containing ink.

DESCRIPTION OF THE INVENTION

Figure 1:
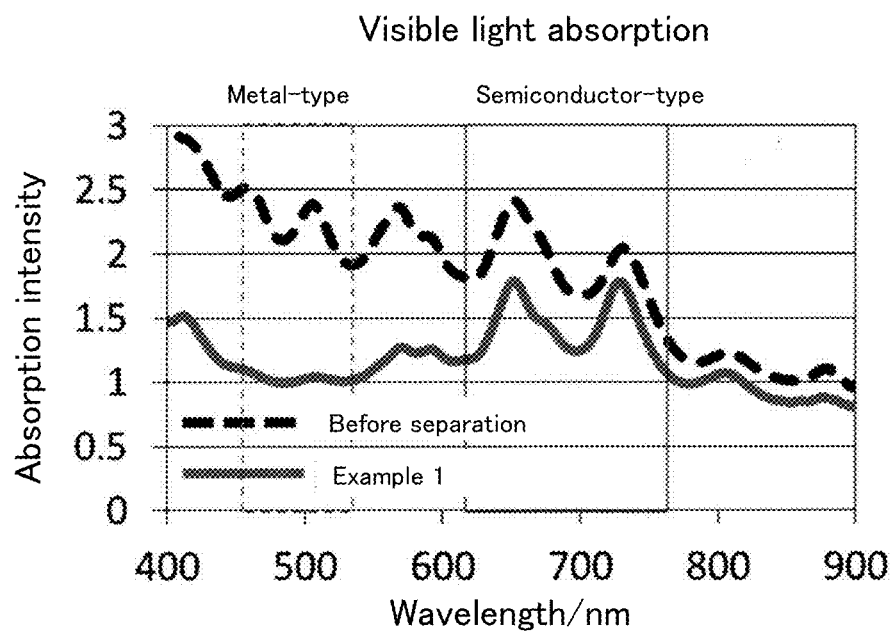
FIG. 1 shows visible-light absorbance spectra of the to-be-separated SWCNT dispersion and the supernatant (SWCNT dispersion) of Example 1.

The present invention is based on the finding that, due to a specific polymer being included in a to-be-separated SWCNT dispersion, separation of a metallic SWCNT and a semiconducting SWCNT in the to-be-separated SWCNT dispersion can be performed by using an easily available separating agent and a simple operation.

In the present invention, a detailed description of a mechanism by which the separation of the metallic SWCNT and the semiconducting SWCNT in the to-be-separated SWCNT dispersion can be performed by a simple operation is not clear; but is inferred as follows.

In the present invention, since a to-be-separated SWCNT dispersion contains a polymer including a structural unit A derived from a monomer represented by the following formula (1) (hereinafter, sometimes abbreviated as "monomer A"), and moreover, the weight-average molecular weight of the polymer is a value within a specified range, the semiconducting SWCNT is selectively dispersed in the dispersion, and on the other hand, the metallic SWCNT is aggregated, so that it is presumed that a good separation of the metallic SWCNT and the semiconducting SWCNT can be achieved by using this to-be-separated SWCNT dispersion as an object of centrifugation. However, the present invention is not to be construed as being limited to these mechanisms.

$$CH_2=CH-COOM \qquad (1)$$

In Formula (1), M represents any of a hydrogen atom, a metal atom, and a group having a structure represented by the following Formula (2).

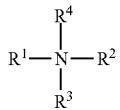

(2)

In Formula (2), $R^1$, $R^2$, $R^3$, and $R^4$ independently represent a hydrogen atom or an alkyl group having 1 to 2 carbon atoms that optionally has a hydroxyl group.

Method for Producing Semiconducting SWCNT Dispersion, Method for Separating Semiconducting SWCNT and Metallic SWCNT In one aspect, the present invention relates to a method for producing a semiconducting SWCNT dispersion, and the method for producing a semiconducting SWCNT dispersion of the present invention (hereinafter, also referred to as "a method for producing a dispersion of the present invention") includes the following step A and step B. In addition, in another aspect, the present invention is a method for separating a semiconducting SWCNT and a metallic SWCNT (hereinafter, also referred to as "a separation method of the present invention") including the following step A and step B.

(Step A) Preparing a to-be-separated SWCNT dispersion that includes a mixture containing a semiconducting SWCNT and a metallic SWCNT (hereinafter, also referred to as a "SWCNT mixture"), a polymer including a structural unit A derived from a monomer represented by the above Formula (1), and an aqueous medium.

(Step B) Centrifuging the to-be-separated SWCNT dispersion and subsequently collecting a supernatant including the semiconducting SWCNT from the centrifuged to-be-separated SWCNT dispersion.

Note that "collecting a supernatant including the semiconducting SWCNT" means collecting a supernatant having an improved ratio of the semiconducting SWCNT with respect to ratios of the semiconducting SWCNT and the metallic SWCNT in the to-be-separated SWCNT dispersion obtained in the step A, and the supernatant is a semiconducting SWCNT dispersion. In the present application, it is not excluded that a relatively small amount of a metallic SWCNT is contained in the supernatant compared with a semiconducting SWCNT. As the separation accuracy increases, the fraction of the semiconducting SWCNT in SWCNT in the supernatant increases, making it more useful as a material for semiconductor devices.

In the step B, collecting the supernatant can be performed, for example, by separating the supernatant and the remainder thereof. The residue includes a precipitate containing relatively more metallic SWCNT than semiconducting SWCNT.

Step A

As an aspect of the step A in the method for producing a dispersion of the present invention and the separation method of the present invention, a mixed liquid containing at least a polymer including a structural unit A derived from the monomer A, the SWCNT mixture, and an aqueous medium (hereinafter, sometimes abbreviated as "mixed liquid A") is prepared, and then the mixed liquid A is subjected to dispersion treatment. The mixed liquid A can be prepared, for example, by adding the SWCNT mixture to an aqueous solution of the polymer.

Polymer Including Structural Unit a Derived from Monomer

In all of the structural units of the polymer, the content of the structural unit A is preferably 50 mol % or more, more preferably 80 mol % or more, still more preferably 90 mol % or more, and still more preferably 95 mol % or more, from the viewpoint of separation accuracy and productivity improvement.

From the viewpoint of separation accuracy and productivity improvement, the polymer may include a structural unit B derived from a monomer B other than the monomer A. Monomer B represents one monomer or two or more monomers other than the monomer A. The monomer B may be appropriately selected depending on the conditions of centrifugation and the like. For example, a monomer that can improve the affinity of the polymer to the semiconducting SWCNT and the metallic SWCNT is preferably used as the monomer B, and it is more preferable that the monomer contains a hydrophobic moiety.

Specific examples of hydrophilic monomers used as the monomer B include dibasic acid monomers such as maleic acid and itaconic acid and salts thereof, monomers containing a polyoxyethylene chain in the molecule, such as methoxypolyoxyethylene (meth)acrylate and polyoxyethylene vinyl ether, and nonionic monomers such as hydroxyethyl (meth)acrylate and acrylamide. Examples of hydrophobic monomers include monomers having an alkyl group (which may include a cyclic structure) having 1 to 24 carbon atoms, such as methyl (meth)acrylate, benzyl (meth)acrylate, methoxypolyoxypropylene (meth)acrylate, and diisobutylene; and styrene. Examples of amphiphilic monomers include monomers having a hydrophobic portion and a hydrophilic portion in the molecule, such as phenoxypolyoxyethylene (meth)acrylate and polyoxypropylene polyoxyethylene (meth)acrylate.

In Formula (1), M is any one of a hydrogen atom, a metal atom, and a group having a structure represented by the following Formula (2) from the viewpoint of separation accuracy and productivity improvement, but is preferably a hydrogen atom, or a group having a structure represented by the following Formula (2), and more preferably a hydrogen atom, from the viewpoint of separation accuracy and productivity improvement, and from the viewpoint of improving versatility.

When the number of moles of all M present in one molecule of the polymer is set to 100 mol %, the molar ratio of hydrogen atoms is preferably 50 mol % or more, more preferably 80 mol % or more, still more preferably 90 mol % or more, still more preferably substantially 100 mol %, and still more preferably 100 mol %, from the viewpoint of improving separation accuracy. In other words, the degree of neutralization of all the structural units A derived from the monomer represented by the above Formula (1) in the polymer by at least one of the metal atoms and the groups having the structure represented by the following Formula (2) is preferably less than 50 mol %, more preferably less than 20 mol %, still more preferably less than 10 mol %, and still more preferably substantially 0 mol % (that is, unneutralized), from the viewpoint of improving the separation accuracy.

The weight-average molecular weight of the polymer is 1,000 or more, preferably 1,500 or more, and still more preferably 2,000 or more, from the viewpoint of separation accuracy and productivity improvement, and is 100,000 or less, preferably 50,000 or less, more preferably 30,000 or less, and still more preferably 10,000 or less, from the same viewpoint. Note that, in the present invention, the weight-average molecular weight of the polymer is obtained by gel permeation chromatography (in terms of polyethylene glycol), and specifically, it can be measured by the method described in the Examples.

The contents of the polymer in the mixed liquid A and the to-be-separated SWCNT dispersion are preferably 0.01% by mass or more, more preferably 0.1% by mass or more, and still more preferably 1% by mass or more, from the viewpoint of separation accuracy and productivity improvement, and is preferably 10% by mass or less, more preferably 5% by mass or less, and still more preferably 3% by mass or less, from the same viewpoint.

SWCNT

There is no particular limitation on SWCNT used for preparing the mixed liquid A and the to-be-separated SWCNT dispersion. SWCNT is synthesized by a conventionally known synthetic method such as a HiPco method or an e-DIPS method, for example, and may include those having various winding manners and diameters. Although a metallic SWCNT and a semiconducting SWCNT may be included in any ratio, a commonly synthesized SWCNT is a SWCNT admixture in which a metallic SWCNT makes up about 1/3 and a semiconducting SWCNT makes up about 2/3.

The mean diameter of the SWCNT is preferably 0.5 nm or more, and more preferably 0.8 nm or more, from the viewpoint of separation accuracy and productivity improvement, and is preferably 3 nm or less, and more preferably 2 nm or less, from the same viewpoint. The mean diameter of the SWCNT can be calculated by measuring and averaging the diameters for 10 or more CNTs from the images obtained using transmission electron microscopy.

The contents of the SWCNT in the mixed liquid A and the to-be-separated SWCNT dispersion are preferably 0.001% by mass or more, more preferably 0.01% by mass or more, and still more preferably 0.03% by mass or more, from the viewpoint of improving separation accuracy, and is preferably 5% by mass or less, more preferably 1% by mass or less, and still more preferably 0.5% by mass or less, from the same viewpoint.

Aqueous Media

The mixed liquid A and the to-be-separated SWCNT dispersion contain an aqueous medium as a dispersion medium. The aqueous medium is preferably water, and the water is preferably pure water, ion-exchanged water, purified water or distilled water from the viewpoint of improving separation accuracy and productivity improvement, and more preferably pure water.

The mixed liquid A and the to-be-separated SWCNT dispersion may contain, as an aqueous medium, a lower alcohol such as methanol, ethanol, or isopropyl alcohol, or a water-soluble organic solvent such as acetone, tetrahydrofuran, or dimethylformamide in addition to water.

When the aqueous medium is a combination of water and a dispersion medium other than water, the proportion of water in the aqueous medium is preferably 70% by mass or more, more preferably 80% by mass or more, and still more preferably 90% by mass or more, from the viewpoint of improving separation accuracy.

In addition to the polymer and the SWCNT, the mixed liquid A and the to-be-separated SWCNT dispersion may contain at least one of a salt and an acid having a molecular weight of less than 1,000. Although the addition of the salt or acid may be performed during the preparation of the mixed liquid or at any stage before or after the dispersion treatment is performed on the mixed liquid, it is preferable that the addition of the acid is performed during the preparation of the mixed liquid or before the dispersion treatment is performed on the mixed liquid, from the viewpoint of separation accuracy and productivity improvement. The contents of the salt or acid in the mixed liquid A and the to-be-separated SWCNT dispersion are preferably 5,000 ppm or less, more preferably 1,000 ppm or less, and still more preferably 500 ppm or less.

The salt having water solubility is preferable from the viewpoint of separation accuracy and productivity improvement, and specific examples thereof include salts of an alkali metal and an alkaline earth metal, and for example, sodium chloride, potassium chloride, calcium chloride, sodium chloride, magnesium chloride, and potassium iodide are preferable.

Examples of the acid include inorganic acids such as hydrochloric acid, nitric acid, sulfuric acid, sulfurous acid, persulfuric acid, hydrochloric acid, and phosphoric acid; and organic acids such as formic acid, acetic acid, chloroacetic acid, hydroxyacetic acid, acrylic acid, methacrylic acid, glycolic acid, propionic acid, butyric acid, and succinic acid.

The dispersion treatment for the mixed liquid A can be performed using, for example, a disperser such as a bath-type ultrasonic disperser, a homomixer, a high-pressure homogenizer, an ultrasonic homogenizer, a jet mill, a bead mill, or a miller.

In the step A, a defoaming treatment may be performed on the mixed liquid A before the dispersion treatment is performed.

Step B

In the step B, the to-be-separated SWCNT dispersion obtained in the step A is subjected to centrifugation, and a supernatant containing a semiconducting SWCNT in the centrifuged to-be-separated SWCNT dispersion is collected. The supernatant has an improved ratio of the semiconducting SWCNT with respect to the ratios of the semiconducting SWCNT and the metallic SWCNT in the to-be-separated SWCNT dispersion prior to being subjected to centrifugation. Although the ratio varies depending on the centrifugation conditions and the like, the rotation speed of the centrifuge is preferably 5,000 rpm or more, and more preferably 10,000 rpm or more, from the viewpoint of separation accuracy and productivity improvement, and is preferably 100,000 rpm or less, more preferably 70,000 rpm or less, from the same viewpoint. The gravitational acceleration of the centrifuge is preferably 10 kG or more, and more preferably 50 kG or more, from the viewpoint of separation accuracy and productivity improvement, and is preferably 1,000 kG or less, and more preferably 500 kG or less, from the same viewpoint.

Method for Producing Semiconducting SWCNT

By collecting the semiconducting SWCNT from the semiconducting SWCNT dispersion produced using the method for producing a semiconducting SWCNT dispersion of the present invention, it is possible to produce a semiconducting SWCNT. Collection of a semiconducting SWCNT from a semiconducting SWCNT dispersion can be performed, for example, by filtering a semiconducting SWCNT from a semiconducting SWCNT dispersion with a membrane filter, and then drying the semiconducting SWCNT.

Semiconducting SWCNT Containing Ink and Method for Producing the Same

A semiconducting SWCNT containing ink includes a semiconducting SWCNT, at least one of an organic solvent and water, and, if necessary, a surfactant and a resin. Therefore, an example of a method for producing a semiconducting SWCNT containing ink of the present invention includes, for example, the above "Method for producing semiconducting SWCNT" as one step, and further includes a step of mixing the semiconducting SWCNT, at least one of an organic solvent and water, and, if necessary, at least one of a surfactant and a resin. Further, another example of a method for producing a semiconducting SWCNT containing ink of the present invention includes, for example, the above "Method for producing semiconducting SWCNT dispersion" as one step, and includes a step of mixing the semiconducting SWCNT dispersion with an organic solvent, a surfactant, and a resin which is miscible with the dispersion, if necessary.

Examples of the organic solvent include aliphatic solvents such as n-hexane, n-octane, and n-decane; alicyclic solvents such as cyclohexane; an aromatic solvent such as benzene and toluene; alcohol solvents such as methanol and ethanol; and glycol ether solvents such as diethylene glycol monomethyl ether, propylene glycol monomethyl ether acetate, and butyl cellosolve. From the viewpoint of improving film formability, the semiconducting SWCNT containing ink may further contain, for example, a polystyrene resin, an acrylic resin, a vinyl resin or the like as the resin which can be dissolved or dispersed in the solvent, or may contain a surfactant or other additives known as a dispersant. The content of the semiconducting SWCNT in the semiconducting SWCNT containing ink may be appropriately set depending on the application.

Method for Producing Semiconductor Device

One aspect of a method for producing a semiconductor device of the present invention includes a step of forming a semiconductor layer by performing, on a substrate, a printing process or coating process in which a semiconducting SWCNT containing ink obtained using the method for producing a semiconducting SWCNT containing ink of the present invention is used.

In addition, one aspect of a method for producing a semiconductor device of the present invention is a method for producing a semiconductor device that comprises a substrate, and a gate electrode, a source electrode, and a drain electrode disposed on the substrate, and includes a step of forming a semiconductor circuit or a semiconductor film (semiconductor layer) by performing a printing process or coating process in which the semiconducting SWCNT containing ink is used. Examples of the printing methods in which the semiconducting SWCNT containing ink is used include ink jet printing, screen printing, offset printing, and letterpress printing. The method may include a step of forming a circuit by forming a semiconductor film through a printing process or coating process and then performing etching or the like on the semiconductor film.

EXAMPLES

1. Method of Measuring Various Parameters
Measurement of Weight-Average Molecular Weight of Polymers The weight-average molecular weight of the polymer used in preparing to-be-separated SWCNT dispersion was measured using gel permeation chromatography (hereinafter, also referred to as "GPC") under the following conditions.

GPC Conditions
  Columns: G4000PWXL+G2500PWXL (manufactured by Tosoh Corporation)
  Eluent: 0.2 M Phosphate Buffer/$CH_3CN$=9/1 (Volume ratio)
  Flow rate: 1.0 mL/min
  Column temperature: 40° C.
  Detection: RI
  Sample size: 0.5 mg/mL
  Standard: Polyethylene glycol equivalent 2. Preparation of Semiconducting SWCNT Dispersions Example 1

To 30 mL of a 3% by mass aqueous solution of polyacrylic acid prepared by dissolving polyacrylic acid (manufactured by Wako Pure Chemical Industries, Ltd., weight-average molecular weight 5,000 (catalog value), unneutralized) in ultrapure water (manufactured by Wako Pure Chemical Industries), 30 mg of a SWCNT mixture (manufactured by NanoIntegris Co., Ltd., HiPco-Raw, the average diameter: 1 nm) synthesized using a HiPco method was added, and a mixed liquid (1) was thus obtained. Then, a dispersion treatment was performed on the mixed liquid (1) for 1 minute using a miller (manufactured by Iwatani Corporation), followed by a defoaming treatment using "Awatori Rentaro (THINKY MIXER)" for 1 minute. Then, the resulting liquid was subjected to dispersion treatment for 30 minutes using an ultrasonic homogenizer (450D manufactured by BRANSON Co., Ltd.) with AMPLITUDE being set to 30% while being stirred with a stirrer, and a to-be-separated SWCNT dispersion (1) was thus obtained in which the content of SWCNT mixture was 0.1% by mass, the content of polyacrylic acid was 3% by mass, and the pH (25° C.) was 2.3. The to-be-separated SWCNT dispersion (1) was centrifuged using an ultracentrifuge (CS100GXII manufactured by Hitachi Koki Co., Ltd., rotor S50A, rotational speed: 50,000 rpm, gravity acceleration: 210 kG) for 30 minutes, and then the supernatant was collected from the liquid level by 80% on a volume basis so as not to raise the precipitated sediment.

Example 2

A to-be-separated SWCNT dispersion and a supernatant of Example 2 were obtained in the same manner as in Example 1, except that a mixed solvent of water and ethanol (mass ratio water/EtOH=97/3) was used as an aqueous solvent for dissolving polyacrylic acid.

Example 3

To the mixed liquid (1) of Example 1, 100 μL of 1 N NaCl was added, and a mixed liquid (3) was thus obtained. Except for this case, a to-be-separated SWCNT dispersion and a supernatant of Example 3 were obtained in the same manner as in Example 1. Note that the contents of NaCl in the mixed liquid (3) and the to-be-separated SWCNT dispersion of Example 3 were 200 ppm by mass.

Example 4

To the mixed liquid (1) of Example 1, 100 μL of 1 N HCl was added, and a mixed liquid (4) was thus obtained. Except for this case, a to-be-separated SWCNT dispersion and a supernatant of Example 4 were obtained in the same manner as in Example 1. Note that the contents of HCl in the mixed liquid (4) and the to-be-separated SWCNT dispersion of Example 4 were 120 ppm by mass.

Example 5

A to-be-separated SWCNT dispersion and a supernatant of Example 5 were obtained in the same manner as in Example 1, except that polyacrylic acid (weight-average molecular weight: 15,000, unneutralized) was used instead of polyacrylic acid (weight-average molecular weight: 5,000, unneutralized).

Example 6

A to-be-separated SWCNT dispersion and a supernatant of Example 6 were obtained in the same manner as in Example 1, except that a copolymer of acrylic acid and phenoxydioxyethylene acrylate (hereinafter, PDEA) (mass ratio AA/PDEA=97/3, weight-average molecular weight:

7,000) was used instead of polyacrylic acid (weight-average molecular weight: 5,000, unneutralized).

Example 7

A to-be-separated SWCNT dispersion and a supernatant of Example 7 were obtained in the same manner as in Example 1, except that a copolymer of acrylic acid and methoxydioxypropylene acrylate (hereinafter, MDPA) (mass ratio AA/MDPA=93/7, weight-average molecular weight: 5,000) was used instead of polyacrylic acid (weight-average molecular weight: 5,000, unneutralized).

Example 8

A to-be-separated SWCNT dispersion and a supernatant of Example 8 were obtained in the same manner as in Example 1, except that a 1% by mass aqueous solution of polyacrylic acid (weight-average molecular weight: 2,000, unneutralized) was used instead of a 3% by mass aqueous solution of polyacrylic acid (weight-average molecular weight: 5,000, unneutralized), and a eDIPS EC1.5 (average diameter: about 1.5 nm) manufactured by Meijo Nano Carbon Co. Ltd. as a SWCNT mixture instead of HiPco-Raw manufactured by NanoIntegris Inc.

Comparative Example 1

A to-be-separated SWCNT dispersion and a supernatant of Comparative Example 1 were obtained in the same manner as in Example 1, except that polyacrylic acid (weight-average molecular weight: 250,000, unneutralized) was used instead of polyacrylic acid (weight-average molecular weight: 5,000, unneutralized).

Comparative Example 2

Although the same procedure as in Example 1 was carried out except that a 1% aqueous solution of acrylic acid (monomer, unneutralized) was used instead of a 3% by mass aqueous solution of polyacrylic acid (weight-average molecular weight: 5,000, unneutralized), it was not possible to obtain a to-be-separated SWCNT dispersion because the resulting liquid could not be brought into a dispersed state.

Comparative Example 3

A to-be-separated SWCNT dispersion and a supernatant of Comparative Example 3 were obtained in the same manner as in Example 1, except that a 1% by mass aqueous solution of sodium deoxycholate was used instead of a 3% by mass aqueous solution of polyacrylic acid (weight-average molecular weight: 5,000, unneutralized).

Comparative Example 4

A to-be-separated SWCNT dispersion and a supernatant of Comparative Example 4 were obtained in the same manner as in Example 1, except that a 1% by mass aqueous solution of sodium dodecyl sulfate (manufactured by Sigma-Aldrich Co., Ltd.) was used instead of a 3% by mass aqueous solution of polyacrylic acid (weight-average molecular weight: 5,000, unneutralized).

Comparative Example 5

A to-be-separated SWCNT dispersion and a supernatant of Comparative Example 5 were obtained in the same manner as in Example 1, except that a 3% by mass aqueous solution of sodium dodecyl sulfate (manufactured by Sigma-Aldrich Co., LLC) was used instead of a 3% by mass aqueous solution of polyacrylic acid (weight-average molecular weight: 5,000, unneutralized).

3. Evaluation (1) Absorbance

For measuring the absorbance, a device capable of measuring an absorbance in a range from visible light to infrared light (US-3010, manufactured by Hitachi, Ltd.,) was used. FIG. 1 shows the visible light absorption spectrum of the to-be-separated SWCNT dispersion of Example 1 (indicated by a dotted line in FIG. 1) and the visible light absorption spectrum of the supernatant (SWCNT dispersion) (indicated by a solid line in FIG. 1). In FIG. 1, for the to-be-separated SWCNT dispersion, absorption is observed in the spectral region corresponding to a metallic SWCNT and the spectral region corresponding to a semiconducting SWCNT, whereas, for the supernatant, absorption in the spectral region corresponding to a metallic SWCNT disappears almost completely, and it can be seen that absorption in the spectral region corresponding to a semiconducting SWCNT increases. It can be seen from these results that the supernatant of Example 1 is a semiconducting SWCNT dispersion that is substantially free of a metallic SWCNT.

As a criterion for evaluating the separability between the metallic SWCNT and the semiconducting SWCNT, the case where the absorption of the metallic SWCNT disappears as shown in FIG. 1 was evaluated as A, the case where the absorption of the metallic SWCNT decreases was evaluated as B, and the case where the absorption of the metallic SWCNT hardly changes was evaluated as C, and when the rating was A or B, it was determined that the separation of the metallic SWCNT and the semiconducting SWCNT was effective. Then, the same evaluation was performed for Examples 2 to 8 and Comparative Examples 1 to 5. The results are shown in Table 1. Note that, for Example 8, since the mean diameter of SWCNT differs from those of Examples 1 to 7 and Comparative Examples 1 to 5, the measurement wavelength was set to 400 to 1200 nm, and evaluation was performed on the same evaluation criterion.

(2) Raman Spectral Analysis

Figure 2:
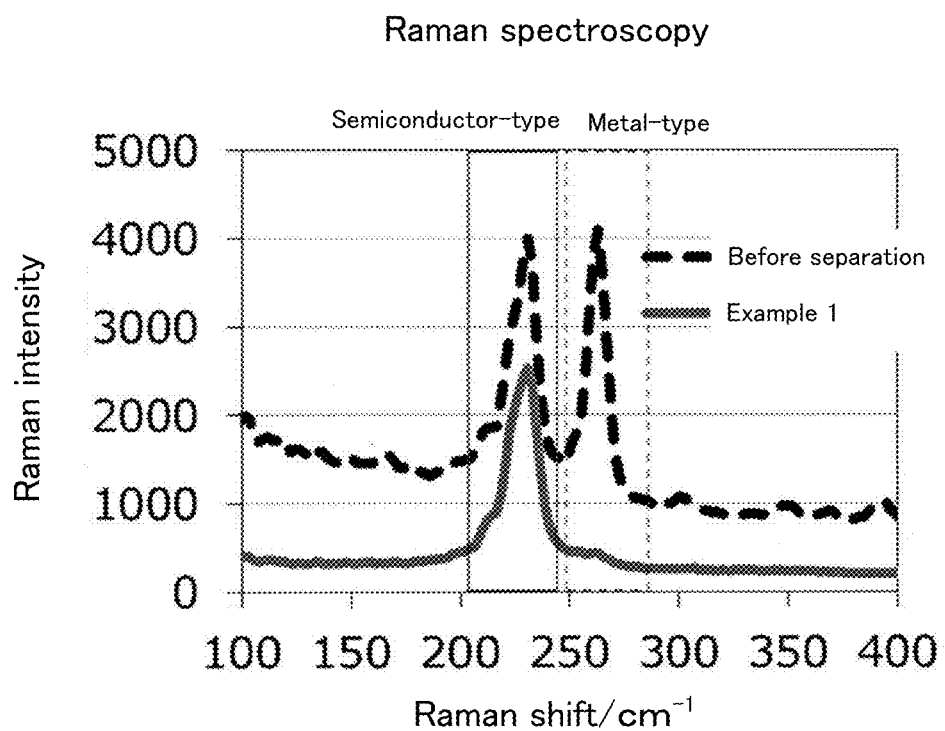
FIG. 2 shows Raman spectra of the to-be-separated SWCNT dispersion and the supernatant (SWCNT dispersion) of Example 1.

The above effects can also be confirmed by Raman spectrum (using a RamanPlus manufactured by Nanophoton Corporation). FIG. 2 shows the Raman spectrum of the to-be-separated SWCNT dispersion (indicated by a dotted line in FIG. 2) of Example 1 and the Raman spectrum of the supernatant (indicated by a solid line in FIG. 2). For the to-be-separated SWCNT dispersion, absorption is observed in the spectral region corresponding to a metallic SWCNT and the spectral region corresponding to a semiconducting SWCNT in FIG. 2, whereas, for the supernatant, absorption in the spectral region corresponding to a metallic SWCNT disappears almost completely.

TABLE 1

| Table 1 | SWCNT mixture Type | SWCNT mixture Content (mass %) | Polymer and its comparison Type | Polymer and its comparison Weight-average molecular weight | Polymer and its comparison Content (mass %) | Salt or acid Type | Salt or acid Content (ppm) | Aq. solution Type | Evaluation Separability |
|---|---|---|---|---|---|---|---|---|---|
| Ex. 1 | HiPco-Raw (NanoIntegris) | 0.1 | Polyacrylic acid | 5000 | 3% | — | — | Water | A |
| Ex. 2 | HiPco-Raw (NanoIntegris) | 0.1 | Polyacrylic acid | 5000 | 3% | — | — | Water/EtOH | A |
| Ex. 3 | HiPco-Raw (NanoIntegris) | 0.1 | Polyacrylic acid | 5000 | 3% | NaCl | 200 | Water | A |
| Ex. 4 | HiPco-Raw (NanoIntegris) | 0.1 | Polyacrylic acid | 5000 | 3% | HCl | 120 | Water | A |
| Ex. 5 | HiPco-Raw (NanoIntegris) | 0.1 | Polyacrylic acid | 15000 | 3% | — | — | Water | A |
| Ex. 3 | HiPco-Raw (NanoIntegris) | 0.1 | p-(AA/PDEA) | 7000 | 3% | — | — | Water | A |
| Ex. 7 | HiPco-Raw (NanoIntegris) | 0.1 | p-(AA/MDPA) | 5000 | 3% | — | — | Water | B |
| Ex. 8 | eDIPS EC1.5 (Meijo Nano Carbon) | 0.1 | Polyacrylic acid | 2000 | 1% | — | — | Water | A* |
| Comp. Ex. 1 | HiPco-Raw (NanoIntegris) | 0.1 | Polyacrylic acid | 250000 | 3% | — | — | Water | C |
| Comp. Ex. 2 | HiPco-Raw (NanoIntegris) | 0.1 | Acrylic acid | Monomer | 1% | — | — | Water | C |
| Comp. Ex. 3 | HiPco-Raw (NanoIntegris) | 0.1 | Sodium deoxycholate | Monomer | 1% | — | — | Water | C |
| Comp. Ex. 4 | HiPco-Raw (NanoIntegris) | 0.1 | Sodium dodecyl sulfate | Monomer | 1% | — | — | Water | C |
| Comp. Ex. 5 | HiPco-Raw (NanoIntegris) | 0.1 | Acrylic acid | Monomer | 3% | — | — | Water | C |

As shown in Table 1, in Examples 1 to 8, the separation accuracy of the metallic SWCNT and the semiconducting SWCNT is remarkably better than that of Comparative Examples 1 to 5.

INDUSTRIAL APPLICABILITY

As described above, according to the method for producing a semiconducting SWCNT dispersion of the present invention, the separation of a metallic SWCNT and a semiconducting SWCNT can be performed in an aqueous medium without using a density gradient forming agent or the like, and further by use of an easily available separating agent and a simple operation, so that improvement in producing efficiency of the method for producing the semiconducting SWCNT dispersion or the semiconducting SWCNT per se can be expected.

The invention claimed is:

1. A method for producing a semiconducting single-walled carbon nanotube dispersion, comprising:
   a step A of preparing a to-be-separated single-walled carbon nanotube dispersion that includes single-walled carbon nanotubes comprising a semiconducting single-walled carbon nanotube and a metallic single-walled carbon nanotube, an aqueous medium, and a polymer including a structural unit A derived from a monomer represented by the following formula (1); and
   a step B of centrifuging the to-be-separated single-walled carbon nanotube dispersion and subsequently collecting a supernatant including the semiconducting single-walled carbon nanotube from the centrifuged to-be-separated single-walled carbon nanotube dispersion,
   wherein a weight-average molecular weight of the polymer is 1,000 or more and 100,000 or less:

$$CH_2CH—COOM \qquad (1)$$

where M represents any one of a hydrogen atom, a metal atom, or a group having a structure represented by the following Formula (2):

where $R^1$, $R^2$, $R^3$, and $R^4$ independently represent a hydrogen atom or an alkyl group having 1 to 2 carbon atoms that optionally has a hydroxyl group.

2. The method for producing a semiconducting single-walled carbon nanotube dispersion according to claim 1, wherein, when the number of moles of all M present in 1 molecule of the polymer is set to 100 mol %, the ratio of hydrogen atoms is 50 to 100 mol %.

3. The method for producing a semiconducting single-walled carbon nanotube dispersion according to claim 1, wherein a content of the structural unit A is 50 mol % or more in all structural units contained in the polymer.

4. The method for producing a semiconducting single-walled carbon nanotube dispersion according to claim 1, wherein, in the step A, after a mixed liquid containing the single-walled carbon nanotube, the aqueous medium, and the polymer is prepared, the mixed liquid is subjected to dispersion treatment to prepare the to-be-separated single-walled carbon nanotube dispersion, and
   in the step A, a salt or an acid having a molecular weight of less than 1,000 is added to the mixed liquid.

5. The method for producing a semiconducting single-walled carbon nanotube dispersion according to claim 1, wherein an average diameter of the single-walled carbon nanotubes used for preparing the to-be-separated single-walled carbon nanotube dispersion in the step A is 0.5 nm or more and 2 nm or less.

6. The method for producing a semiconducting single-walled carbon nanotube dispersion according to claim 1, wherein a content of the polymer in the to-be-separated single-walled carbon nanotube dispersion is 0.01% by mass or more and 10% by mass or less.

7. The method for producing a semiconducting single-walled carbon nanotube dispersion according to claim 1, wherein a content of the single-walled carbon nanotubes in the to-be-separated single-walled carbon nanotube dispersion is 0.001% by mass or more and 5% by mass or less.

8. The method for producing a semiconducting single-walled carbon nanotube dispersion according to claim 1, wherein the aqueous medium contains water, and a proportion of water in the aqueous medium is 70% by mass or more.

9. The method for producing a semiconducting single-walled carbon nanotube dispersion according to claim 1, wherein a gravitational acceleration of a centrifuge for centrifugation in the step B is 10 kG or more and 1,000 kG or less.

10. The method for producing a semiconducting single-walled carbon nanotube dispersion according to claim 1, wherein the polymer is at least one selected from the group consisting of polyacrylic acid, a copolymer of polyacrylic acid and a monomer containing a polyoxyethylene chain in a molecule, and salts thereof.

11. The method for producing a semiconducting single-walled carbon nanotube dispersion according to claim 1, wherein a content of a salt or an acid in the to-be-separated single-walled carbon nanotube dispersion is 5,000 ppm or less.

12. The method for producing a semiconducting single-walled carbon nanotube dispersion according to claim 1, wherein the supernatant including the semiconducting single-walled carbon nanotube is a semiconducting single-walled carbon nanotube dispersion.

13. The method for producing a semiconducting single-walled carbon nanotube dispersion according to claim 1, further comprising a printing step of forming a film on a substrate with a printing ink containing the semiconducting single-walled carbon nanotube from the supernatant in step B.

14. A method for producing a semiconducting single-walled carbon nanotube, comprising a step of collecting the semiconducting single-walled carbon nanotube by filtering a semiconducting single-walled carbon nanotube dispersion obtained using the method for producing a semiconducting single-walled carbon nanotube dispersion according to claim 1.

15. A method for producing a precipitate that contains more metallic single-walled carbon nanotubes,
the method comprising:
the step A and the step B according to claim 1,
wherein the precipitate is a residue left after collecting the supernatant in the step B.

* * * * *